(12) United States Patent
Burk et al.

(10) Patent No.: US 7,662,876 B2
(45) Date of Patent: Feb. 16, 2010

(54) ARYLALKYLSILYLS USED AS FLAME RETARDANT ADDITIVES

(75) Inventors: Johst Hermann Burk, Mohegan Lake, NY (US); Sergei Vladimirovich Levchik, Croton-on-Hudson, NY (US); Vladmir Petrovich Prokopovich, Minsk (BY); Elena Alekseevna Murashko, Minsk (BY); Irena Arkadeyvna Klimovzova, Minsk (BY)

(73) Assignee: Supresta LLC, Ardsley, NY (US)

( * ) Notice: Subject to any disclaimer, the term of this patent is extended or adjusted under 35 U.S.C. 154(b) by 345 days.

(21) Appl. No.: 10/583,206

(22) PCT Filed: Dec. 15, 2004

(86) PCT No.: PCT/US2004/042087

§ 371 (c)(1),
(2), (4) Date: Jun. 21, 2007

(87) PCT Pub. No.: WO2005/061607

PCT Pub. Date: Jul. 7, 2005

(65) Prior Publication Data

US 2007/0272903 A1 Nov. 29, 2007

Related U.S. Application Data

(60) Provisional application No. 60/530,932, filed on Dec. 19, 2003.

(51) Int. Cl.
*C08K 5/5419* (2006.01)

(52) U.S. Cl. ............... 524/265; 524/266; 524/267; 524/268; 524/604; 524/605; 528/29

(58) Field of Classification Search ............... None
See application file for complete search history.

(56) References Cited

U.S. PATENT DOCUMENTS

| | | | | |
|---|---|---|---|---|
| 3,346,515 A * | 10/1967 | Curry | ............ | 528/29 |
| 3,370,039 A * | 2/1968 | Webb | ............ | 525/477 |
| 3,423,361 A * | 1/1969 | Ismail et al. | ............ | 528/14 |
| 4,026,827 A * | 5/1977 | Steffen | ............ | 528/14 |
| 4,148,773 A * | 4/1979 | Mark et al. | ............ | 524/261 |
| 6,753,401 B1 * | 6/2004 | Reddy et al. | ............ | 528/15 |
| 2003/0060548 A1 | 3/2003 | Goossens et al. | | |
| 2003/0199631 A1 | 10/2003 | Itagaki et al. | | |

FOREIGN PATENT DOCUMENTS

| DE | 2832342 | 1/1980 |
|---|---|---|
| EP | 0497004 | 8/1992 |

OTHER PUBLICATIONS

Lasocki, Zygmunt et al.:"Thermosetting and Thermoplastic Silicone Resins," Feb. 28, 1978, Chemical Abstracts.
1979: 104902 & PL 97290, Feb. 28, 1978.

* cited by examiner

*Primary Examiner*—Marc S Zimmer
(74) *Attorney, Agent, or Firm*—Dilworth & Barrese, LLP.

(57) ABSTRACT

Flame retarded resin compositions comprise at least one resin selected from the group consisting of polycarbonate, polyester and mixtures thereof, and a flame retarding effective amount of at least one nonhalogenated arylalkylsilyl flame retardant, the flame retarded resin composition being substantially free of haloorganic flame retardant and phosphate flame retardant.

33 Claims, No Drawings

ARYLALKYLSILYLS USED AS FLAME RETARDANT ADDITIVES

CROSS REFERENCE TO RELATED APPLICATION

This application claims the benefit of Provisional U.S. Patent Application Ser. No. 60/530,932, filed Dec. 19, 2003, the entire contents of which are incorporated by reference herein.

BACKGROUND OF THE INVENTION

This invention relates to flame retarded resin compositions that are safe and impose minimal environmental loads.

Due to having excellent mechanical, electrical and thermal properties, molded parts comprising aromatic polycarbonate resins have been commonly used in engineering plastics in a wide variety of applications, including business machines, electric and electronic devices, automotive parts, and in building fields components. To overcome the drawbacks of aromatic polycarbonate resins in regard to their processablity and modability, a number of polymer blends with other thermoplastic resins, such as polystyrene resins, acrylonitrile-butadiene-styrene (ABS) resins and polyester resins have been developed. Among others, polymer alloys comprising an ABS resin have been widely used in the automobile, business machine and electric and electronic fields.

In current applications, including for business machines, electronic appliances and the like, it is strongly desired to have the resin materials flame retardant. To meet this requirement, numerous flame retarding techniques have been proposed for aromatic polycarbonate resins and polymer alloys with other thermoplastic resins.

As disclosed in U.S. Pat. No. 6,043,310, a common practice is to use an organic halide flame retardant containing bromine in combination with a flame retardant aid such as antimony trioxide. Resin compositions of this formulation are made flame retardant to a relatively large extent, but raise environmental problems in giving off harmful or toxic substances upon disposal by incineration. In addition, the production of molded parts from such resin compositions has the disadvantage that, if thermally decomposed, the flame retardant releases hydrogen halide which can cause corrosion of the molds used in the manufacturing process or detract from the physical properties of molded resin parts themselves. For this reason, efforts have been made to achieve flame retardancy without resorting to organic halide compounds containing bromine.

For example, attempts have been made to use oligomeric phosphate esters in combination with polytetrafluoroethylene, which has a fibrillating ability. Aromatic bisphosphates have characteristics such as low volatility, high temperature stability and low tendency to exude the polymer. Aromatic bisphosphates are used as a flame retardant or plasticizer for imparting fire retardancy, temperature stability and good moldability to thermoplastic resin. Also, aromatic bisphosphates show resistance to temperatures up to 300° C., which is necessary for the processing of some engineering plastics.

However, the long-term heat and hydrolytic stability of a polycarbonate (PC)/ABS blend flame retarded with aromatic bisphosphates is not always satisfactory. Furthermore, aromatic phosphates tend to decrease the dimensional stability of the resin at elevated temperatures.

By contrast, silicone resins have high heat resistance, do not emit toxic gases upon combustion, and are safe in themselves. Several types of silicone resins have been proposed as a flame retardant for polycarbonate resins. U.S. Pat. Nos. 5,955,542, 6,001,921, and 6,184,312, and European Patent Application No. 1,094,093, 1,272,565, and 1,293,551 all describe flame retarded resin compositions containing silicone resins comprising di- and trifunctional siloxane units, having a relatively high molecular weight and bearing phenyl groups. Allegedly, these silicone resins, which have branched structures, offer improved heat resistance, and the silicone resins bearing phenyl groups exert flame retardant effects by forming an incombustible silicon-carbon (Si—C) ceramic layer through mutual coupling of aromatic rings on the surface of the resin to which it is added.

Also, U.S. Pat. Nos. 6,326,425 and 6,509,421 describe a thermoplastic resin composition comprising an aromatic polycarbonate resin and a methyl-phenyl or isopropyl-phenyl silicone oligomer.

PCT Patent Application No. WO 99/28387 describes a flame retardant polycarbonate resin composition comprising, as essential components, an aromatic polycarbonate resin, a branched organic silicone and an alkali metal salt of perfluoroalkanesulfonic acid.

European Patent No. 1,277,799 describes a flame retardant polycarbonate resin composition comprising branched methyl-phenyl siloxane in combination with potassium perfluorobutane sulfonate or the potassium salt of diphenylsulfonic acid. Similarly, the use of a branched methyl-phenyl siloxane, either in combination with polytetrafluroethylene or sodium trichlorobenzenesulfonate (U.S. Pat. No. 6,534,576) or in combination with sodium chloride (European Patent Application EP 1,302,510) has also been described.

The use of linear poly(methylsiloxanes) or poly(methylphenylsiloxanes) in polycarbonate compositions is described in U.S. Pat. Nos. 6,541,548, 6,451,906 and 6,454,969.

PCT Patent Application No. WO 02/46288 describes a flame retarded polycarbonate resin composition comprising a poly(methylphenylsiloxane) in combination with bisphenol A bis(diphenyl phosphate). PCT Patent Application WO No. 02/081566 and European Patent Application No. 1,342,753 describe similar compositions but in combination with potassium perfluorobutane sulphonate or diphenylsulfon-3 sulfonate.

The use of cyclic octaphenylcyclotetrasiloxane is described in European Patent Application No. 1,278,798 and in U.S. Pat. No. 6,541,548.

Copolymers of linear polysiloxanes with polycarbonate resin, which provide flame retardant performance, are described in U.S. Pat. Nos. 6,323,280 and 6,576,706 and in PCT Patent Application Nos. WO 03/008501 and WO 03/42305.

By using transmission electron microscopy, it was shown in European Patent Application No. 1,272,565 that in molded parts siloxane moieties are mostly distributed near the surface of the part. It is believed that when these resin compositions are burned, organopolysiloxane molecules or an organopolysiloxane and a resin component are joined through oxidative decomposition and crosslinking of akoxy or organooxy groups, to form a network structure which is fixed in proximity to the burning portion, thus exerting flame retardant effects.

BRIEF SUMMARY OF THE INVENTION

In accordance with the present invention, there are provided flame retarded resin compositions comprising at least one resin selected from the group consisting of polycarbonate, polyester and mixtures thereof, and a flame retarding effective amount of at least one nonhalogenated arylalkylsilyl flame retardant, the flame retarded resin composition being substantially free of haloorganic flame retardant and phosphate flame retardant.

When the resin compositions of this invention contain one or more higher oligomer forms of the arylalkylsilyl flame retardant, they can exhibit antidripping properties. The flame retarded resin compositions herein possess a high level of safety and in excluding haloorganic fire retardants, minimize the relatively high environmental loads and manufacturing problems associated with the use of such materials and in excluding phosphate flame retardants, avoid or reduce a lowering of heat resistance to which the phosphate materials are susceptible.

The expression "flame retarded" as applied to the resin compositions of this invention shall be understood to mean either an increase in Limited Oxygen Index (LOI) or an increase in antidripping properties of the resin composition. LOI is the minimal concentration of oxygen at which combustion of a resin composition will be sustained and may be measured in accordance with ASTMD 2863. Antidripping is a measure of the resistance of a resin composition undergoing combustion from below to drip and may be measured in accordance with UL 94 test (vertical protocol).

DETAILED DESCRIPTION OF THE INVENTION

The resin component of the flame retarded resin composition herein is selected from polycarbonate resin, polyester resin, and their mixtures. In addition to the foregoing resins, one or more other thermoplastic resins can optionally be included in the flame retarded resin composition.

The polycarbonate resins used in the practice of the present invention can be any of the known molding-grade polycarbonates, the aromatic polycarbonates being preferred. Thus, for example, the polycarbonate can be made via interfacial processes or by melt process (catalytic transesterification). The polycarbonate can be either branched or linear in structure and can include functional substituents. Polycarbonate copolymers are also included within the invention. Techniques for the manufacture of polycarbonates are well known, for example, from U.S. Pat. Nos. 3,030,331, 3,169,121, 4,130,548, 4,286,083, 4,552,704, 5,210,268 and 5,606,007, the entire contents of which are incorporated by reference herein. Useful polycarbonates can be characterized as having a high melt strength, e.g., a melt strength of at least about $R^*=1.8$ where $R^*$ is the viscosity ratio at 1 rad/s and at 100 rad/s measured at a temperature when the viscosity at 100 rad/s is equal to 20,000 poise. High melt strength can be an inherent property of the polycarbonate, for example, as a result of a branched polycarbonate structure, or can be achieved through the addition of an antidrip agent.

The preferred aromatic polycarbonate resins can be prepared by reacting a diphenol compound such as, but not limited to, hydroquinone, resorcinol, bisphenol A, bisphenol F, bisphenol S, and the like, with phosgene and generally have an average molecular weight of from about 10,000 to about 200,000. The diphenols can be used as homopolymers alone or copolymers of two or more of these diphenols or blends thereof.

The polyester resins to be used in the practice of the present invention can be any of the known molding-grade polyesters. The polyester resins can be derived from dicarboxylic acids and diols and/or from hydroxycarboxylic acids or the corresponding lactones, such as, but not limited to, polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers, and also polyesters modified with polycarbonates.

The thermoplastic resins to be used in the practice of the present invention can be any of the known molding-grade thermoplastic resins. Thermoplastic resins that can be included are, but not limited to, polystyrene, acrylonitrile-butadiene-styrene (ABS), high impact polystyrene (HIPS), polyamides, polyethylene, polypropylene, polysulfone, polyvinyl acetate, ethylene-vinyl acetate copolymers, poly(methyl methacrylate), polyethylene oxide, cellulose acetate and cellulose nitrate, with the ABS resins being preferred.

Polystyrene resins that can be included in the resin are polymers produced through the polymerization of unsaturated monomers containing aromatic vinyl monomers. Additional polymers modified with rubbery polymers can also be included in the resin.

The ABS resins that can be included in the present invention are graft polymers produced through graft polymerization of vinyl monomers containing aromatic vinyl monomers with rubbery polymers.

Other rubbery resins can be used such as, polybutadiene, polyisoprene, styrene-butadiene rubber (SBR), alpha-methylstyrene-butadiene rubber, alpha-methylstyrene-isoprene rubber, styrene-isoprene-butadiene rubber (SIBR), styrene-isoprene rubber (SIR), isoprene-butadiene rubber (IBR), alpha-methylstyrene-isoprene-butadiene rubber and alpha-methylstyrene-styrene-isoprene-butadiene rubber.

Mixtures of polymers produced through polymerization of vinyl monomers containing aromatic vinyl monomers and the graft polymers are also useful. The graft polymers are produced by graft polymerizing an aromatic vinyl monomer and one or more monomers selected from (meth)acrylonitrile, (meth)acrylates, maleimide monomers and unsaturated dicarboxylic acid anhydride monomers with rubbery polymers having a glass transition temperature of 10° C. or lower.

The weight ratio of the total amount of polycarbonate resin(s) and/or polyester resin(s) to the total amount of optional other thermoplastic resin(s) can range from about 10:1 to 1:10 and preferably from about 2:1 to about 1:2.

In a preferred embodiment, the flame retarded resin composition will contain from about 30 parts by weight of one or more polycarbonate resins, polyester resins or mixtures thereof to about 70 parts by weight of one or more optional other thermoplastic resins, and in a more preferred embodiment, from about 50 parts by weight of one or more polycarbonate resins, polyester resins or mixtures thereof to about 50 parts by weight of one or more optional other thermoplastic resins. The foregoing preferred and more preferred weight proportions assure that the flame retarded resin composition will maintain satisfactory levels of flame retardance, impact resistance and processing and molding characteristics.

The arylalkylsilyl flame retardant component of the flame retarded resin compositions herein can be represented by the following formula:

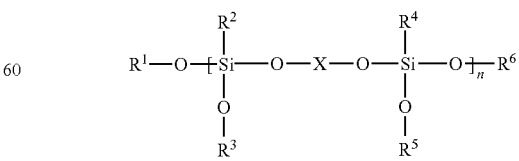

wherein $R^1$, $R^3$, $R^5$ and $R^6$ each independently is aryl or substituted aryl, preferably of up to about 22 carbon atoms, and more preferably of from about 6 to about 12 carbon atoms; $R^2$ and $R^4$ each independently is lower alkyl, preferably of from 1 to 4 carbon atoms; X is a bridging group derived from a diol possessing an arylene moiety, preferably hydroquinone, resorcinol or bisphenol A; and, n has a value of up to about 20, preferably a value of up to 5 and more preferably a value of 1 or 2. Mixtures of such arylalkylsilyl flame retardants are contemplated.

Among the preferred arylalkylsilyl flame retardants are those represented by the following formula:

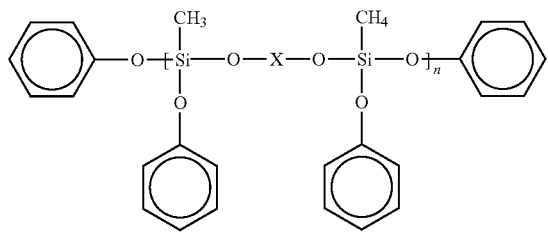

wherein bridging group X is

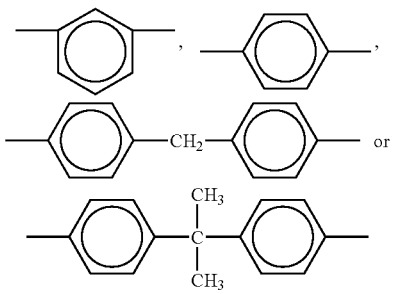

The arylalkylsilyl flame retardant herein can be made by reacting an alkyltrichlorosilane with phenol or a substituted phenol followed by reaction with a diphenol. Suitable diphenols include, but are not limited to, hydroquinone, resorcinol, bisphenol A, bisphenol F, bisphenol S and other di-hydroxy functional molecules. Depending on the ratio of phenol to diphenol, different molecular weight oligomers can be synthesized. Unreacted and partially reacted species can be removed from the reaction mixture by distillation.

When it is desired to obtain an arylalkysilyl flame retardant which is high in dimer relative to higher oligomer, it is preferred to react a molar excess of alkyltrichlorosilane with diphenol to obtain diphenyl bis(dichloroalkylsilane) followed by distillation of the unreacted alkyltrichlorosilane and thereafter reacting the diphenyl bis(dichloroalkylsilane) with a molar excess of the same or different phenol to provide the aforesaid dimer-rich arylalkylsilane flame retardant product from which unreacted phenol is removed by distillation.

When phenoxy groups are incorporated in the arylalkylsilyl compounds, transesterification and crosslinking with the polycarbonate or polyester can take place during combustion so as to form a flame retarded layer in proximity to the burnt portion thus preventing flaming particles from dripping and spreading the fire to other combustible materials.

In addition to the arylalkylsilyl flame retardant(s) of the invention, other customary additives may be added in the usual amounts to the flame retarded resin compositions during the kneading or molding step to achieve desired enhanced physical properties for the final composition provided, of course, they do not compromise the physical properties of the resin composition to any appreciable extent. Additional additives include polymeric compatibilizers such as colorants, fillers, stabilizers, elastomers (other than the aforementioned optional thermoplastic resin), reinforcements, for example, carbon and glass fibers, fillers such as talc and calcium carbonate, UV absorbers, lubricants, mold release agents, plasticizers, flow modifiers, antistatic agents, dispersants, and the like.

In preparing the flame retarded resin compositions of the invention, any known or conventional method can be employed. Most often, a resin composition is prepared by first combining the resin component(s) with a flame retarding effective amount of the arylalkylsilyl flame retardant, further combining any desired optional components and other additives, and mixing the resulting composition. The order of mixing these components is not critical. Using well-known molding techniques, the flame retarded resin compositions thus obtained can be molded into a variety of molded parts, typically electric appliance parts.

The following Examples merely illustrate certain embodiments of the present invention and are not to be construed in a limiting sense.

EXAMPLE 1

First, 50 g (0.33 mol) of methyltrichlorosilane was added in droplet form with continuous stirring to 62.8 g (0.66 mol) of phenol over a five minute period at room temperature (25° C.) under a continuous flow of dry nitrogen. The reaction mixture was heated up to 75° C. After two hours of stirring at this temperature, the reaction mixture was heated to 150-170° C. and then stirred for two hours. After cooling, 18.4 g (0.167 mol) of hydroquinone was added to the mixture. Then, the reaction mixture was heated up to 75-100° C. After one hour of stirring at this temperature, the reaction mixture was heated up to 150-200° C. and then stirred for three hours. Unreacted substances were then removed by distillation under vacuum at 170° C./15 mm. The residue was a viscous light-brown liquid consisting of a dimer and oligomeric materials. This mixture of products was separated by distillation under vacuum. The dimer (Dimer 1) was a colorless liquid, which had a boiling temperature of 230-240° C./15 mm. The yield of dimer was 25%. The oligomer (Oligomer 1) was a light-yellow jelly-like mass. The yield of oligomer was 50%. The measured content of Si in dimer was 8.98% and was 11.5% in oligomer.

EXAMPLE 2

First, 50 g (0.33 mol) of methyltrichorosilane was added in droplet form with continuous stirring to 62.8 g (0.66 mol) of phenol over a five minute period at room temperature under a continuous flow of dry nitrogen. The reaction mixture was then heated to 75° C. After two hours of stirring at this temperature, it was heated up to 150-170° C. and then stirred for an additional two hours. After cooling, 18.4 g (0.167 mol) resorcinol was added. Then the reaction mixture was heated up to 75-100° C. After one hour of stirring at this temperature, the reaction mixture was heated up to 150-200° C. and then stirred for an additional three hours. Unreacted substances were removed by distillation under vacuum at 170-175° C./15 mm. The residue appeared as a viscous light-brown liquid. A mixture of products was separated by distillation under vacuum. A Dimer (Dimer 2) was a colorless liquid, which had boiling temperature 220-230° C./15 mm. The yield of dimer was 27%. An oligomer (Oligomer 2) was isolated as a yellow jelly mass. The yield of this oligomer was 53%. The measured content of Si in the dimer was 8.46% and was 10.0% in oligomer.

EXAMPLE 3

First, 100 g (0.66 mol) of methyltrichorosilane were added as droplets with continuous stirring to 125.6 g (1.32 mol) of phenol over a five minute period at room temperature under a continuous flow of dry nitrogen. The reaction mixture was heated up to 70-75° C. After two hours of stirring at this temperature, it was then heated to 170° C. and then stirred for an additional four hours. After cooling, 68 g (0.344 mol) of 4,4'methylenediphenol was then added. Then the reaction mixture was heated to 170° C. and then stirred for four hours. Non-reacted substances were removed by distillation under vacuum at 170° C./15 mm. The residue was a light-yellow jelly mass (Oligomer 3) with a yield of 73%.

EXAMPLE 4

First, 50 g (0.33 mol) of methyltrichlorosilane were added in droplet for with continuous stirring to 62.8 g (0.66 mol) of phenol over five minutes at room temperature under a continuous flow of dry nitrogen. The reaction mixture was heated to 75° C. After two hours of stirring at this temperature, it was heated to 170° C. and then stirred for an additional four hours. After cooling, 38 g (0.17 mol) of 4,4'isopropylenediphenol was added. The reaction mixture was heated to 170° C. and then stirred for an additional four hours. Non-reacted substances were removed by distillation under vacuum at 170° C./15 mm. The residue was a viscous light-brown liquid. This mixture of products was separated by distillation under vacuum. A dimer (Dimer 3) component, which was a colorless liquid, having boiling temperature of 120-235° C./15 mm, was isolated. The yield of dimer was 23%. An oligomer (Oligomer 4), which was a light brown jelly mass, was also isolated. The yield of this oligomer was 57%.

EXAMPLE 5

In this example, 40 g of polycarbonate resin, 8 g of ABS resin, and 12 g of the flame retardant additives from each of Examples 1-4 were melt blended in a bowl-type mixer at 250° C. over a period of five minutes. The resulting flame retarded compositions were then compression molded into slabs (3.0 mm thickness). Specimens (3.0×6.0×120 mm in size) for flammability tests were then cut from the slabs. The flammability of these PC/ABS formulations was then evaluated by Limiting Oxygen Index (LOI) test (ASTM D 2863). The LOI test evaluates the minimal concentration of $O_2$ at which combustion of the test polymer composition is sustained. The results are shown in Table 1:

TABLE 1

| Experiment | Flame Retardant | LOI |
|---|---|---|
| 1 (Control) | None | 23.4 |
| 2 | Dimer 1 | 24.7 |
| 3 | Oligomer 1 | 21.6 |
| 4 | Dimer 2 | 26.2 |
| 5 | Oligomer 2 | 24.2 |
| 6 | Oligomer 3 | 22.1 |
| 7 | Dimer 3 | 24.2 |
| 8 | Oligomer 4 | 23.3 |

As these data show, Dimers 1-3 provide significantly improved flame retardancy relative to the control which contains no flame retardant additive. While Oligomers 1-4 exhibited less flame retardancy than the control, they imparted desirably high antidripping properties to the resin samples.

EXAMPLE 6

In this example, 51 g of polycarbonate resin and 9 g of the flame retardant additive of Example 1 were melt blended in a bowl-type mixer at 250° C. over a period of five minutes. The resulting flame retarded composition was then compression molded into slabs of 3.0 mm and 1.6 mm thickness. Specimens cut from the 3.0×6.0×120 mm sized material were used in an LOI test and specimens cut from the 1.6×12.5×125 mm sized material were used in a for UL 94 flammability tests. Flammability of PC formulations were evaluated by the LOI test according to ASTM D 2863 and antidripping performance according to UL 94 test (vertical protocol) wherein "no drips" indicate no combusted resin material separated from the body of the resin as could cause spreading of the fire to other combustible materials. The results are shown in Table 2 against a control formulation not containing the flame retardant.

TABLE 2

| | Arylmethylsilyl | | UL 94 | |
|---|---|---|---|---|
| Experiment | Flame Retardant | LOI | Rating | Dripping |
| 1 | None | 24.6 | Fail | Drips |
| 2 | Oligomer 1 | 25.9 | V-1 | No drips |

The foregoing examples merely illustrate certain embodiments of the present invention and for that reason should not be construed in a limiting sense. The scope of protection that is sought is set forth in the claims that follow.

The invention claimed is:

1. A flame retarded resin composition comprising at least one resin selected from the group consisting of polycarbonate, polyester and mixtures thereof, and a flame retarding effective amount of at least one nonhalogenated arylalkylsilyl flame retardant represented by the formula

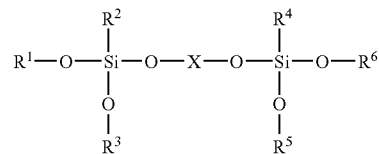

wherein $R^1$, $R^3$, $R^5$ and $R^6$ each independently is aryl or substituted aryl; $R^2$ and $R^4$ each independently is a lower alkyl; X is a bridging group derived from a diol possessing an arylene moiety; and, n has a value of up to about 20; the flame retardant resin composition being substantially free of haloorganic flame retardant and phosphate flame retardant.

2. The flame retarded resin composition of claim 1 wherein the polycarbonate resin is an aromatic polycarbonate and the polyester resin is an aromatic polyester.

3. The flame retarded resin composition of claim 1 further comprising at least one other molding grade thermoplastic resin.

4. The flame retarded resin composition of claim 3 wherein the other molding grade thermoplastic resin is selected from the group consisting of polystyrene, acrylonitrile-butadiene-styrene, high impact polystyrene, polyamides, polyethylene, polypropylene, polysulfone, polyvinyl acetate, ethylene-vinyl acetate copolymers, poly(methyl methacrylate), polyethylene oxide, cellulose acetate, cellulose nitrate and mixtures thereof.

5. The flame retarded resin composition of claim 2 further comprising at least one other molding grade thermoplastic resin.

6. The flame retarded resin composition of claim 5 wherein the other molding grade thermoplastic resin is selected from the group consisting of polystyrene, acrylonitrile-butadiene-styrene, high impact polystyrene, polyamides, polyethylene, polypropylene, polysulfone, polyvinyl acetate, ethylene-vinyl acetate copolymers, poly(methyl methacrylate), polyethylene oxide, cellulose acetate, cellulose nitrate and mixtures thereof.

7. The flame retarded resin composition of claim 1 wherein the polycarbonate resin is present at a level of from about 70 to about 100 weight %.

8. The flame retarded resin composition of claim 1 wherein the polyester resin is present at a level of from about 70 to about 100 weight %.

9. The flame retarded resin composition of claim 1 wherein the polycarbonate resin is present at a level of from about 50 to about 100 weight %.

10. The flame retarded resin composition of claim 1 wherein the polyester resin is present at a level of from about 50 to about 100 weight %.

11. The flame retarded resin composition of claim 3 wherein the other thermoplastic resin is present at a level up to about 50 weight %.

12. The flame retarded resin composition of claim 3 wherein the other thermoplastic resin is present at a level of up to about 30 weight %.

13. The flame retarded composition of claim 1 wherein $R^1$, $R^3$, $R^5$ and $R^6$ each independently is aryl or substituted aryl of from 6 to about 22 carbon atoms, $R^2$ and $R^4$ each independently is a lower alkyl of from 1 to about 4 carbon atoms, and n has a value of up to 5.

14. The flame retarded composition of claim 1 wherein $R^2$ and $R^4$ each is a methyl group.

15. The flame retarded composition of claim 1 wherein bridging group x is represented by one of the following structures:

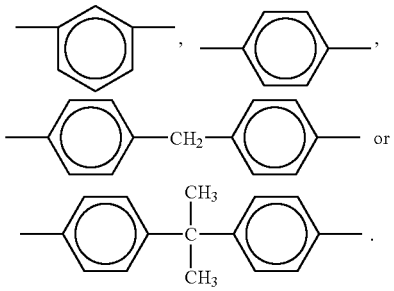

16. The flame retarded composition of claim 1 wherein n is 1 or 2.

17. The flame retarded composition of claim 1 wherein the arylalkysilyl flame retardant is present at a level of from 1 to about 30 weight %.

18. The flame retarded composition of claim 2 wherein $R^1$, $R^3$, $R^5$ and $R^6$ each independently is aryl or substituted aryl of from 6 to about 22 carbon atoms, $R^2$ and $R^4$ each independently is a lower alkyl of from 1 to about 4 carbon atoms, and n has a value of up to 5.

19. The flame retarded composition of claim 2 wherein $R^2$ and $R^4$ each is a methyl group.

20. The flame retarded composition of claim 2 wherein bridging group x is represented by one of the following structures:

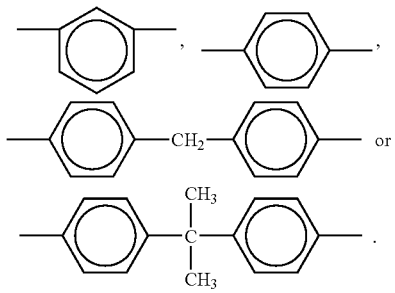

21. The flame retarded composition of claim 2 wherein n is 1 or 2.

22. The flame retarded composition of claim 2 wherein the arylalkysilyl flame retardant is present at a level of from 1 to about 30 weight %.

23. The flame retarded composition of claim 3 wherein $R^1$, $R^3$, $R^5$ and $R^6$ each independently is aryl or substituted aryl of from 6 to about 22 carbon atoms, $R^2$ and $R^4$ each independently is a lower alkyl of from 1 to about 4 carbon atoms, and n has a value of up to 5.

24. The flame retarded composition of claim 3 wherein $R^2$ and $R^4$ each is a methyl group.

25. The flame retarded composition of claim 3 wherein bridging group X is represented by one of the following structures:

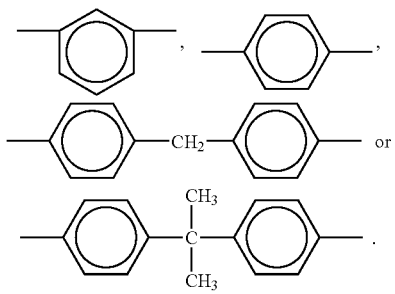

26. The flame retarded composition of claim 3 wherein n is 1 or 2.

27. The flame retarded composition of claim 3 wherein the arylalkysilyl flame retardant is present at a level of from 1 to about 30 weight %.

28. The flame retarded composition of claim 5 wherein $R^1$, $R^3$, $R^5$ and $R^6$ each independently is aryl or substituted aryl of from 6 to about 22 carbon atoms, $R^2$ and $R^4$ each independently is a lower alkyl of from 1 to about 4 carbon atoms, and n has a value of up to 5.

29. The flame retarded composition of claim 5 wherein $R^2$ and $R^4$ each is a methyl group.

30. The flame retarded composition of claim 5 wherein bridging group x is represented by one of the following structures:

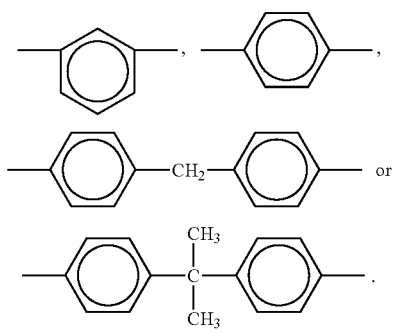

31. The flame retarded composition of claim 5 wherein n is 1 or 2.

32. The flame retarded composition of claim 5 wherein the arylalkysilyl flame retardant is present at a level of from 1 to about 30 weight %.

33. A method for making arylalkylsilyl flame retardant of claim 1 having a high weight ratio of dimer to oligomer which comprises reacting a molar excess of an alkyltrichlorosilane with a diphenol to obtain a diphenyl bis(dichloroalkylsilane), removing unreacted alkyltrichlorosilane by distillation, reacting the diphenyl bis(dichloroalkylsilane) from which unreacted aklyltrichlorosilane has been removed with a molar excess of the same or different phenol to provide arylalkylsilyl flame retardant and removing unreacted phenol from the arylalkysilyl flame retardant by distillation.

* * * * *